March 1, 1927.
H. A. ROAT
BAIT BOX
Filed May 1, 1925
1,619,634
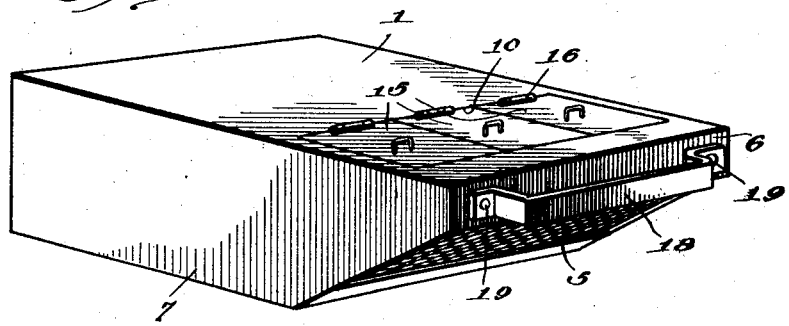
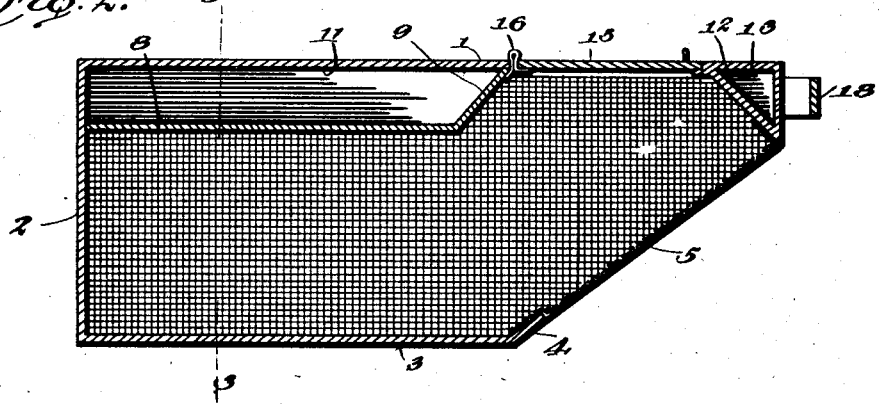
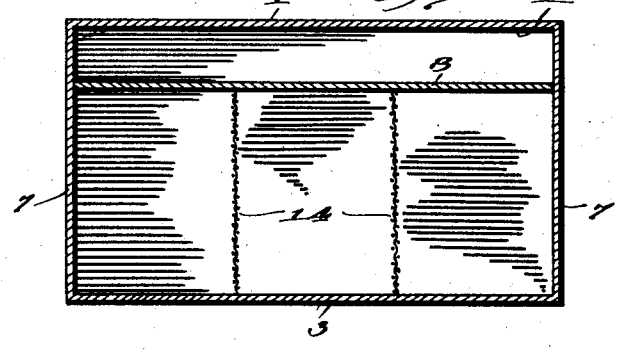
WITNESSES
INVENTOR
H. A. Roat,
BY
ATTORNEYS Patented Mar. 1, 1927.

1,619,634

UNITED STATES PATENT OFFICE.

HARRY ALBRIGHT ROAT, OF MANCHESTER, NEW YORK, ASSIGNOR OF ONE-HALF TO GEORGE M. MESSINGER, OF MORGANZA, PENNSYLVANIA.

BAIT BOX.

Application filed May 1, 1925. Serial No. 27,221.

My invention relates to improvements in bait boxes, and it consists in the combinations, constructions and arrangements herein described and claimed.

An object of the invention is the provision of a bait box having float chambers in the upper part thereof and being adapted to permit the circulation of water through the space beneath said float chambers so that the box will remain upright when placed in the water with the top of the box at or above the surface of the water, the top of the box being provided with normally closed openings permitting access to the bait within the box when the box is floating in the water.

A further object of the invention is the provision of a box of the character described which can be drawn easily through the water or anchored in a swiftly flowing stream without water splashing from the box.

Other objects and advantages of the invention will be apparent from the following description, considered in conjunction with the accompanying drawings in which—

Figure 1 is a perspective view of the improved bait box,

Figure 2 is a longitudinal vertical section through the box, and

Figure 3 is a section substantially along the line 3—3 of Figure 2.

The improved box comprises a top 1 which preferably is rectangular although it may have any other desirable and suitable configuration. A vertical rear end wall 2 has a width equal to that of the top 1 and is merged at its upper end into the rearward end of the top 1 and at its lower end into the rear end of an imperforate bottom section 3. The imperforate bottom section 3 has a width equal to that of the top 1 but is shorter than the top 1 and is merged at its forward end into an upwardly and forwardly extending flange 4 to which is secured the lower end of an upwardly and forwardly inclined foraminous bottom section 5. The latter also has a width equal to that of the top 1 and is secured at its upper end to the lower end of the front end 6 of the box. The front end 6 of course is shorter than the rear end 2 and is joined integrally or otherwise at its upper end to the forward end of the top 1. The box also comprises a pair of vertical side members 7, each of which is imperforate and is joined integrally or otherwise at its upper end to the top 1, at its rearward end to the rear end 2, at its forward end to the front end 6 and at its bottom to the sections 3—4 and 5 of the bottom, each side member 7 having the forward portion of its bottom edge inclined to conform to the inclination of the flange 4 of the imperforate bottom section 3 and the foraminous bottom section 5.

A sub-top or partition comprises a horizontal imperforate section 8 and an inclined section 9. The section 8 is joined at its rearward end to the inner wall of the rear end 2 and at its sides to the inner wall of the side members 7 and extends within the box for part of the length of the latter. The inclined section 9 is joined at its lower end to the forward end of the section 8, at its sides to the inner wall of the side members 7 and at its upper end to the lower wall of the top 1 rearwardly of an opening 10 in the top 1. A relatively large air chamber, designated 11, thus is defined within the box. This air chamber is relatively shallow and has a width equal to that of the box and a length slightly less than that of the imperforate section 3 of the bottom of the box. An upwardly and rearwardly inclined transverse partition 12 is joined at its lower end to the front end wall 6, at its sides to the side members 7 and at its upper end to the lower wall of the top 1 at the forward edge of the opening 10. The line of juncture of the inclined partition 12 with the front end wall 6 lies substantially in the plane of the section 8 of the first named partition and a relatively small float chamber 13 which thus is produced within the upper part of the box at the forward end thereof by reason of the provision of the partition 12 will terminate at its lower end at substantially the same level as the larger float chamber 11.

The space within the box below the float chambers 11 and 13 is adapted for the reception of bait and may be divided by longitudinally extending vertical foraminous partitions 14 into a plurality of separate bait compartments. Access to all of said bait compartments may be had through the opening 10. The opening 10 may be closed by a plurality of lids 15, there being a lid for each of the bait compartments within the box and each lid being attached by a hinge 16 to the top 1 at the rear edge of the opening 10 and being swingable to and from position to close the upper end of the particular bait compartment with which it is associated. Each lid 15 may be kept closed releasably by any suitable known cooperative fastening elements, not shown, on the top 1 adjacent to the front edge of the opening 10 and on the lid.

A handle 18 may be secured, as at 19, to the front end of the box. From the foregoing description of the various parts of the device, the operation thereof may be readily understood. Access to any one of the bait compartments may be had without opening any other bait compartment. The float chambers in the upper part of the box render the box sufficiently buoyant to support the top of the box at or above the level of water in which the box rests while at the same time water circulates through the bait compartments and live bait thus may be kept in good condition. The construction prevents splashing of water from the box when the box is upright.

I claim:—

1. A bait box comprising a top, a rear end, a front end, sides, and a bottom consisting of an imperforate section of less length than the top and a foraminous section extending between said imperforate section of the bottom and the lower end of said front wall of the box.

2. A bait box comprising a top, a rear end, a front end, sides, and a bottom consisting of an imperforate section of less length than the top and a foraminous section extending between said imperforate section of the bottom and the lower end of said front wall of the box, said foraminous bottom section being inclined, and said imperforate bottom section including an inclined flange at the lower end of said foraminous section.

3. A bait box comprising a top, a rear end, a front end, sides, and a bottom consisting of an imperforate section of less length than the top and a foraminous section extending between said imperforate section of the bottom and the lower end of said front wall of the box, said foraminous bottom section being inclined, said imperforate bottom section including an inclined flange at the lower end of said foraminous section, a top having an opening above said foraminous bottom section and including a hinged lid for closing said opening, said box having a float chamber in the upper part forwardly of said opening in the top, and having another float chamber in its upper part extending rearwardly from said opening in the top to the rearward end of said box.

4. A bait box comprising a top, sides, a rear end, a front end and a bottom including an imperforate rear section and an inclined foraminous front section, partition walls in said box cooperating with walls of the box to provide a float chamber in the upper part of the box extending from an opening in the top of the box rearwardly to the rear end of the box and a second float chamber extending from the forward wall of said opening in the top to the front end of the box, the adjacent walls of said float chambers diverging toward their lower ends, longitudinal vertically disposed foraminous partitions in said box dividing the space below said float chambers into a plurality of bait chambers, each communicating with said opening in the top, and a plurality of hinged lids for closing said opening in the top, each lid being adapted to cover one of said bait compartments, there being a lid for each bait compartment.

HARRY ALBRIGHT ROAT.